(12) United States Patent
Whitehead

(10) Patent No.: US 9,422,704 B2
(45) Date of Patent: *Aug. 23, 2016

(54) REPLACEMENT CLOSET FLANGE

(71) Applicant: IPS Corporation, Collierville, TN (US)

(72) Inventor: James H. Whitehead, Collierville, TN (US)

(73) Assignee: IPS Corporation, Collierville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/676,329

(22) Filed: Apr. 1, 2015

(65) Prior Publication Data

US 2015/0204059 A1 Jul. 23, 2015

Related U.S. Application Data

(63) Continuation of application No. 13/238,956, filed on Sep. 21, 2011, now Pat. No. 9,068,678.

(51) Int. Cl.
*E03D 11/16* (2006.01)
*F16L 23/024* (2006.01)

(52) U.S. Cl.
CPC .............. *E03D 11/16* (2013.01); *F16L 23/024* (2013.01); *Y10T 29/49428* (2015.01); *Y10T 29/49826* (2015.01)

(58) Field of Classification Search
CPC ................................ E03D 11/16; E03D 11/17
USPC ............................ 4/252.1–252.4; 285/56, 58
See application file for complete search history.

(56) References Cited

U.S. PATENT DOCUMENTS

| 569,247 A | 10/1896 | Smith |
| 2,810,603 A * | 10/1957 | Storch ........................ B60J 5/04 |
| | | 285/222.2 |
| 2,976,543 A | 3/1961 | Turner et al. |

(Continued)

FOREIGN PATENT DOCUMENTS

| CA | 530215 A | 9/1956 |
| DE | 419477 C | 9/1925 |

(Continued)

OTHER PUBLICATIONS

Push N' Repair Closet Flange | IPS Corporation [online] [retrieved Sep. 21, 2011]. Retrieved from the Internet: <URL: http://www.ipscorp.com/watertite/closetflanges/pushnrepair>. 1 page.

*Primary Examiner* — Lauren Crane
(74) *Attorney, Agent, or Firm* — Alston & Bird LLP

(57) ABSTRACT

The present invention provides a replacement closet flange for installing into an end of a drain pipe having an inner surface and a method of assembling a replacement closet flange. In general, the replacement closet flange includes a main body comprising a substantially cylindrical section and a flange section extending radially outward from and approximately perpendicular to an upper end of the cylindrical section, a flexible seal attached to at least a portion of the cylindrical section proximate a lower end thereof and configured, when the replacement closet flange is installed, to sealingly engage with the inner surface of the drain pipe, and at least one retaining clip attached to a location about an outer periphery of the cylindrical section. The retaining clip includes a retaining tab proximate an end thereof configured, when the replacement closet flange is installed, to fixedly engage with an inner surface of the drain pipe.

18 Claims, 4 Drawing Sheets

(56) References Cited

U.S. PATENT DOCUMENTS

| | | |
|---|---|---|
| 3,037,212 A | 6/1962 | Kleinhof |
| 3,046,028 A | 7/1962 | Nathan |
| 3,048,415 A | 8/1962 | Shook |
| 3,311,391 A | 3/1967 | Harrell |
| 3,349,412 A | 10/1967 | Schwartz et al. |
| 3,501,172 A | 3/1970 | Pickard |
| 3,579,670 A | 5/1971 | Frank |
| 3,911,635 A | 10/1975 | Traupe |
| 4,059,289 A | 11/1977 | Morris et al. |
| 4,329,744 A | 5/1982 | Cuschera |
| 4,502,166 A | 3/1985 | Brown, Sr. |
| 4,505,499 A | 3/1985 | Uglow et al. |
| 4,574,402 A | 3/1986 | Brown, Sr. |
| 4,799,713 A | 1/1989 | Uglow |
| 4,850,617 A | 7/1989 | Moberly |
| 5,291,619 A | 3/1994 | Adorjan |
| 5,297,817 A | 3/1994 | Hodges |
| 5,937,450 A | 8/1999 | Jones |
| 6,070,910 A * | 6/2000 | Hodges ............ F16L 25/10 285/15 |
| 6,332,632 B1 | 12/2001 | Hodges |
| 6,745,408 B2 | 6/2004 | Spells, Sr. |
| 6,789,275 B2 | 9/2004 | Spells, Sr. et al. |
| 7,055,184 B2 | 6/2006 | Humber |
| 7,188,376 B2 | 3/2007 | Ortiz et al. |
| 7,814,580 B2 | 10/2010 | Coronado et al. |
| 2003/0025275 A1 | 2/2003 | Miller |
| 2004/0163165 A1 | 8/2004 | Ortiz et al. |
| 2005/0035558 A1 | 2/2005 | Dipzinski et al. |
| 2005/0050623 A1 | 3/2005 | Greene |
| 2005/0108814 A1 | 5/2005 | Thompson |
| 2006/0170208 A1 | 8/2006 | Arning et al. |
| 2008/0148469 A1 | 6/2008 | Dipzinski et al. |
| 2009/0119826 A1 | 5/2009 | Coronado |
| 2011/0035867 A1 | 2/2011 | Coronado et al. |

FOREIGN PATENT DOCUMENTS

| | | |
|---|---|---|
| WO | WO 2004/074587 A2 | 9/2004 |
| WO | WO 2009/063334 A2 | 5/2009 |

* cited by examiner

REPLACEMENT CLOSET FLANGE

CROSS-REFERENCE TO RELATED APPLICATIONS

This application is a continuation application of U.S. patent application Ser. No. 13/238,956, filed on Sep. 21, 2011, which is incorporated herein in its entirety by reference.

FIELD OF THE INVENTION

The present invention relates to devices for use in pipe systems, and more particularly to a replacement flange for connecting a toilet to a drain pipe or fitting hub.

BACKGROUND

In residential and commercial building construction it is often necessary to connect the base of a toilet to a drain pipe in a secure and watertight manner that meets all plumbing codes applicable in the local jurisdiction. The most common way of achieving this connection is to utilize a so-called closet flange. A typical closet flange is flat and round and includes a pair of semi-circular diametrically opposed key-shaped slots, which allow for the insertion of bolts that are used to tighten the base of the toilet to the flange. Early closet flanges were made of cast iron and were connected to cast iron drain pipes. Modern closet flanges are typically made of ABS or PVC plastic and include a cylindrical body portion that is attached to a drain pipe made of a similar plastic and an attachment flange portion that extends radially from the upper end of the main cylindrical body portion and is bolted to the base of the toilet.

In many instances, such as during repair or remodeling activities, it may become desirable to repair or replace a toilet assembly, which often also requires replacing the associated closet flange. As part of this process, an old or damaged closet flange may be removed from the end of the drain pipe and a new replacement closet flange may be installed. Due to residual components remaining in the end of the drain pipe and/or various other factors, however, the replacement closet flange may resist installation and/or may tend to back out of the drain pipe or otherwise not stay installed in the end of the drain pipe. It is desirable, therefore, to provide a replacement closet flange that facilitates installation in the end of a drain pipe.

BRIEF SUMMARY OF VARIOUS EMBODIMENTS

The present invention addresses the above needs and achieves other advantages by providing a replacement closet flange for installing into an end of a drain pipe having an inner surface. In general, the replacement closet flange includes a main body comprising a substantially cylindrical section and a flange section extending radially outward from and approximately perpendicular to an upper end of the cylindrical section, a flexible seal attached to at least a portion of the cylindrical section proximate a lower end thereof and configured, when the replacement closet flange is installed, to sealingly engage with the inner surface of the drain pipe, and at least one retaining clip attached to a location about an outer periphery of the cylindrical section, wherein the retaining clip includes a retaining tab proximate an end thereof configured, when the replacement closet flange is installed, to fixedly engage with an inner surface of the drain pipe, thus locking the replacement closet flange in position.

In some embodiments, the retaining tab may extend outward and upward from the retaining clip. In some embodiments, the retaining tab may include at least one pointed end configured to facilitate engagement with the inner surface of the drain pipe. In some embodiments, the retaining tab may include two pointed ends configured to facilitate engagement with the inner surface of the drain pipe. In some embodiments, the replacement closet flange may include a plurality of retaining clips approximately equally spaced about an outer periphery of the cylindrical section. In some embodiments, the main body comprising the flange section and the cylindrical section may be a single part. In some embodiments, the flange and cylindrical sections may be constructed of a rigid plastic material, the flexible seal may be constructed of an elastomeric material, and the retaining clip may be constructed of a rust inhibitive material. In some embodiments, the rust inhibitive material may be stainless steel.

In some embodiments, the flange section may include a groove extending into a portion thereof proximate the upper end of the cylindrical section, and the retaining clip may include an installation tab located proximate a second end thereof configured to engage with a surface within the groove, thus securing the retaining clip to the main body. In some embodiments, the portion of the cylindrical section proximate the lower end thereof may have a decreased outer diameter and may be configured to position the flexible seal. In some embodiments, the flexible seal may be attached to the portion of the cylindrical section via a stretch fit. In some embodiments, the flexible seal may further comprise at least one outwardly extending tapered ring configured, when the replacement closet flange is installed, to sealingly engage with the inner surface of the drain pipe. In some embodiments, the flexible seal may include a plurality of outwardly extending tapered rings configured, when the replacement closet flange is installed, to sealingly engage the inner surface of the drain pipe.

The present invention also provides a method of assembling a replacement closet flange. In general, the method includes receiving a main body comprising a substantially cylindrical section and a flange section extending outward from and approximately perpendicular to an upper end of the cylindrical section, receiving a flexible seal, receiving at least one retaining clip, wherein the retaining clip includes an outwardly extending retaining tab located proximate an end thereof, attaching the flexible seal around at least a portion of the cylindrical section proximate a lower end thereof, and attaching the retaining clip to a location about an outer periphery of the cylindrical section of the main body.

In some embodiments, the flange section may include a groove extending into a portion thereof proximate the upper end of the cylindrical section, and the retaining clip may include an installation tab located proximate a second end thereof, and wherein the step of attaching the retaining clip to a location about an outer periphery of the cylindrical section of the main body may comprise inserting the second end of the retaining clip into the groove such that the installation tab engages with a surface within the groove, thus securing the retaining clip to the main body. In some embodiments, the step of receiving at least one retaining clip may comprise receiving a plurality of retaining clips, each retaining clip including an outwardly extending retaining tab located proximate an end thereof. In some embodiments, the flange section may include a groove extending into a portion thereof proximate the upper end of the cylindrical section, and each of the plurality of retaining clips may include an installation tab located proximate a second end thereof, and wherein the step of attaching the retaining clip to a location about an outer periphery of the cylindrical section of the main body may comprise inserting one end of each of the plurality of retaining clips into the groove of the flange section at approximately equal spacing about the outer periphery of the cylindrical section. In some embodiments, attaching the flexible seal around at least a portion of the cylindrical section proximate a lower end thereof may comprise stretching the flexible seal around the portion of the cylindrical section proximate the lower end thereof to create a stretch fit.

BRIEF DESCRIPTION OF THE DRAWINGS

Figure 1:
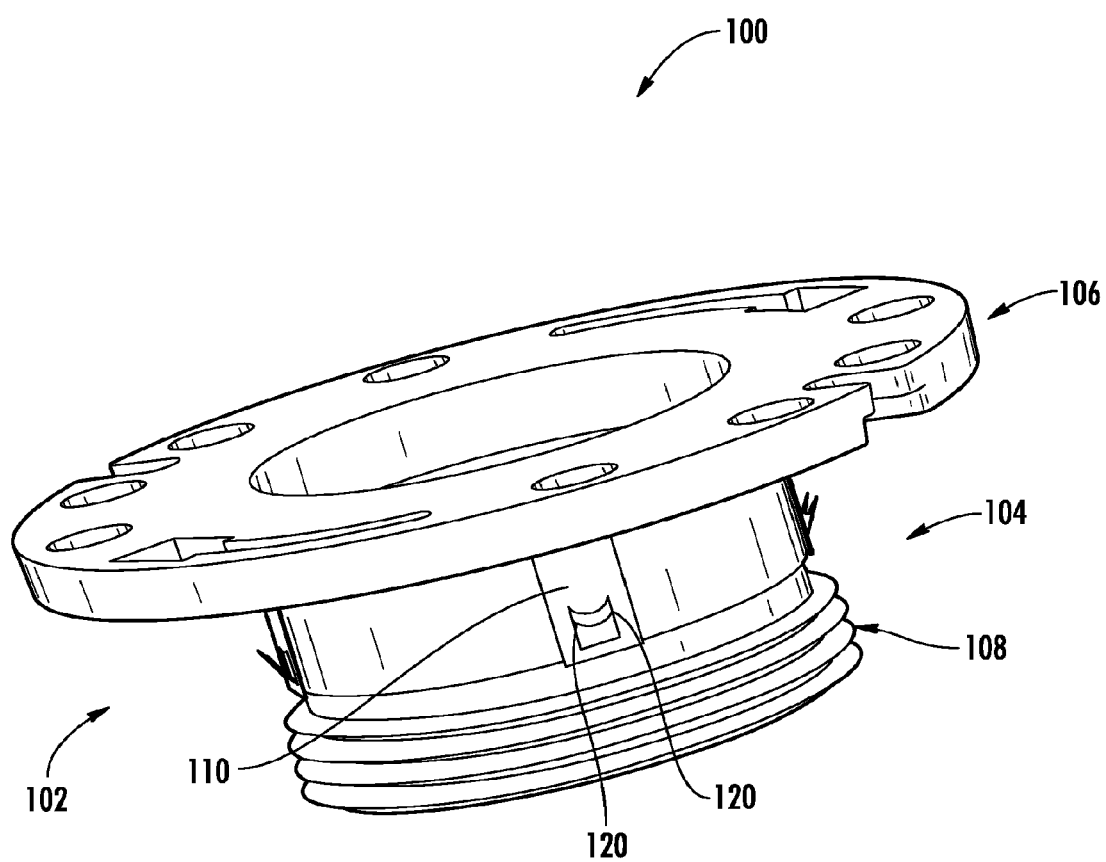
Figure 2:
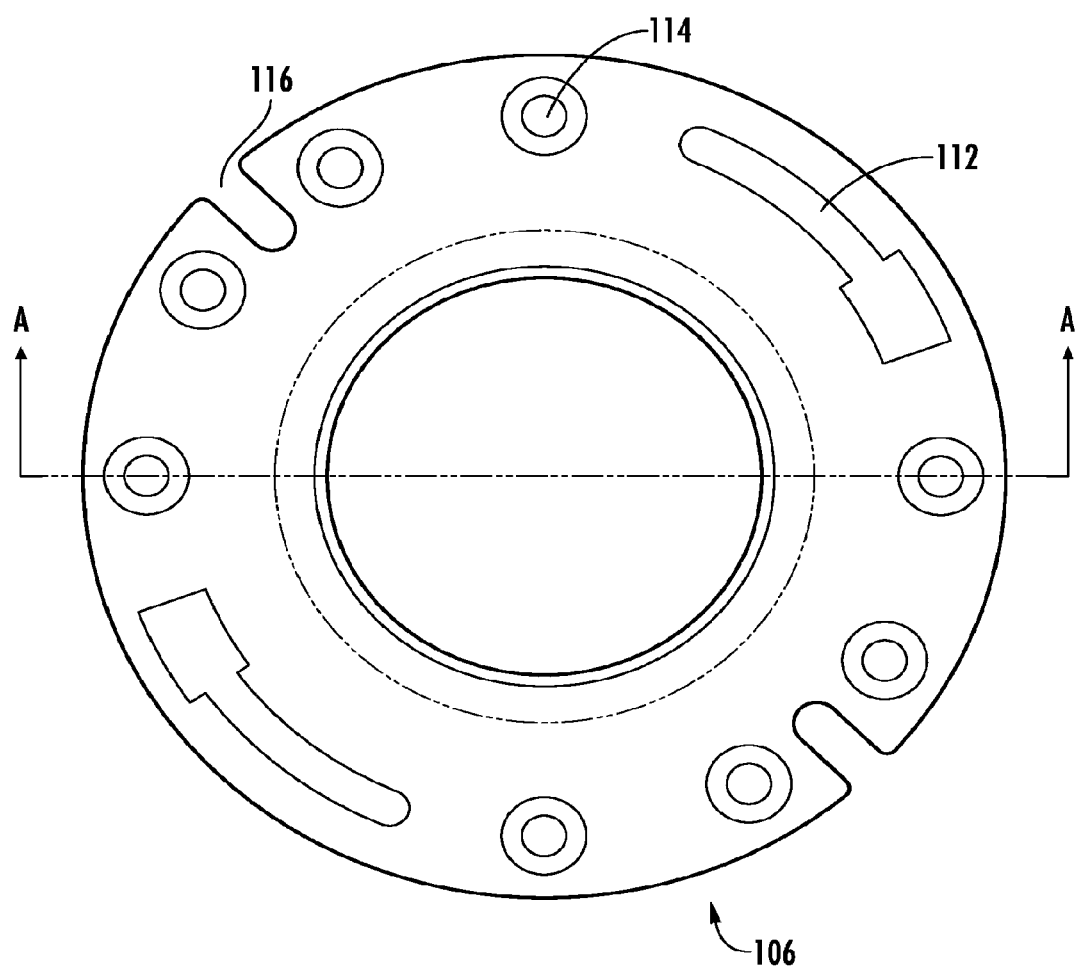
Figure 3:
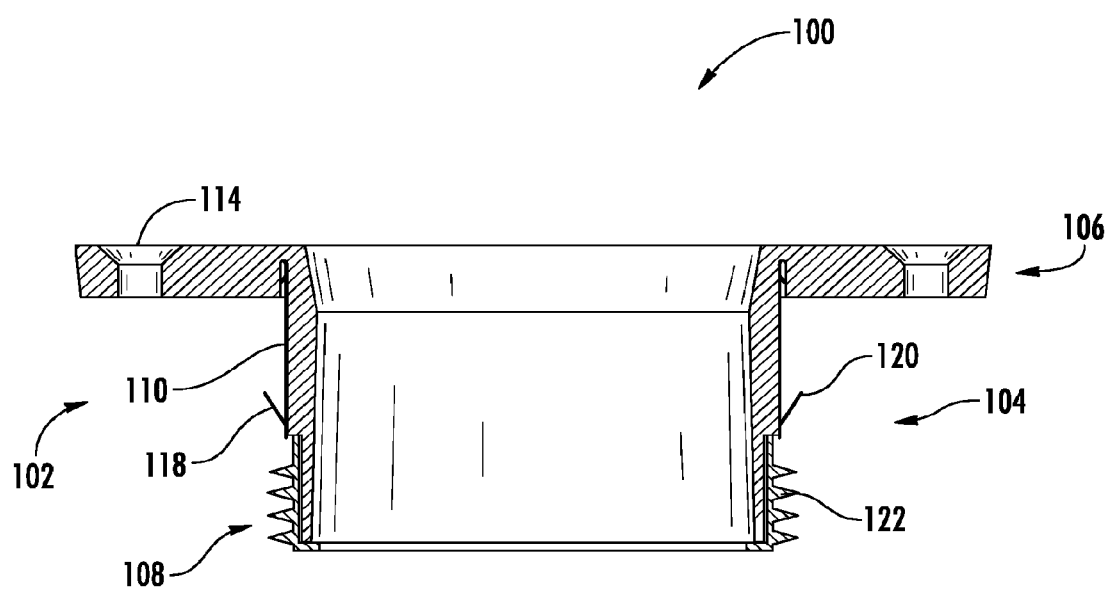
Figure 4:
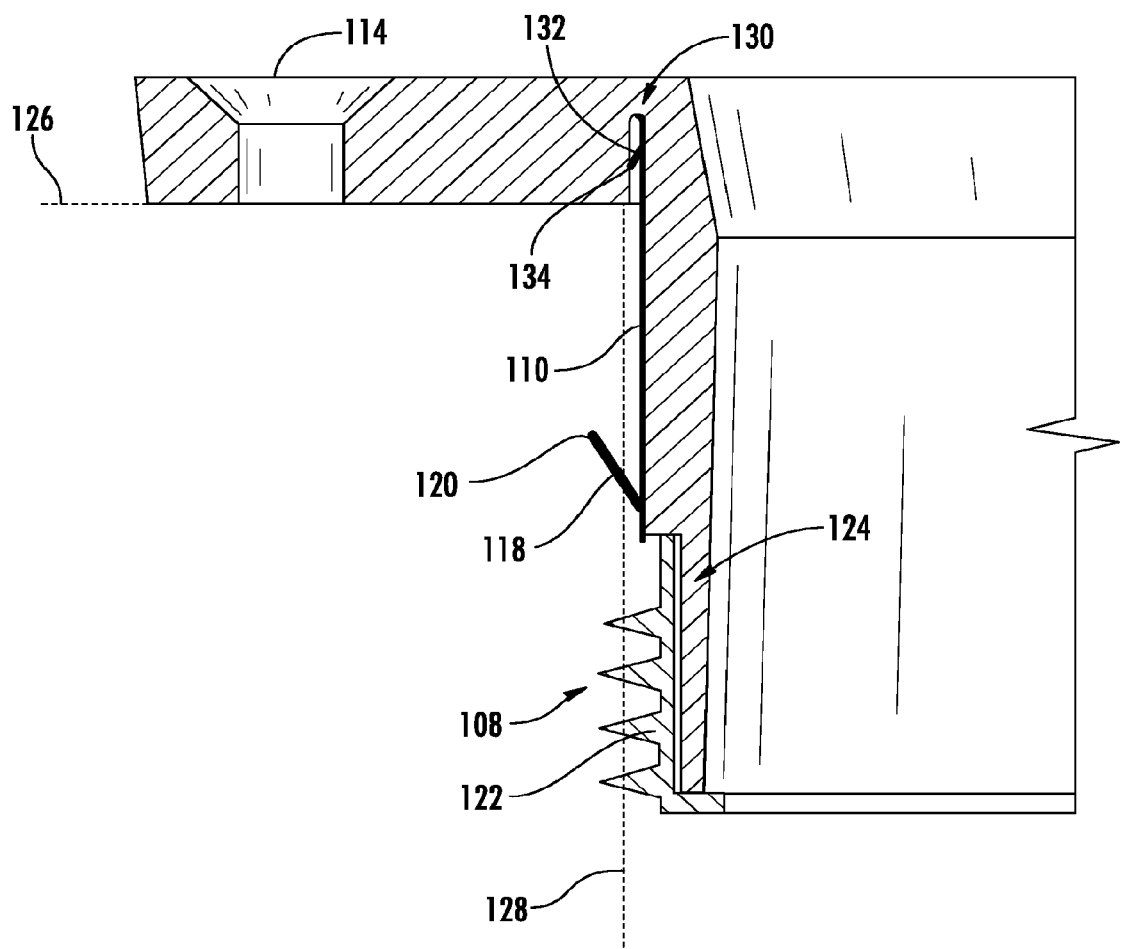

Having thus described the invention in general terms, reference will now be made to the accompanying drawings, which are not necessarily drawn to scale, and wherein:

FIG. 1 is a perspective view of a replacement closet flange in accordance with one exemplary embodiment of the invention;

FIG. 2 is a top view of a replacement closet flange in accordance with one exemplary embodiment of the present invention;

FIG. 3 is a cross-section view of the replacement closet flange of FIG. 2 in accordance with one exemplary embodiment of the present invention; and FIG. 4 is a partial cross-section view in close-up of a portion of the replacement closet flange of FIG. 3 in accordance with one exemplary embodiment of the present invention.

DETAILED DESCRIPTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

FIG. 1 is a perspective view of a replacement closet flange in accordance with one exemplary embodiment of the invention. The replacement closet flange 100 of the depicted embodiment includes a main body 102 that generally comprises a substantially cylindrical section 104 and a flange section 106. The flange section 106 extends radially outward from an upper end of the cylindrical section 104 such that the flange section 106 is substantially perpendicular to the upper end of the cylindrical section 104. A flexible seal 108 is located proximate a lower end of the cylindrical section 104. The replacement closet flange 100 of the depicted embodiment also includes a plurality of retaining clips 110. As will be described in more detail below, when the replacement closet flange 100 is installed into the end of a drain pipe, the flexible seal 108 sealingly engages with an inner surface of the drain pipe and the retaining clips 110 lock the replacement closet flange 100 in position.

In the depicted embodiment, the main body 102 is a single part comprising the cylindrical section 104 and the flange section 106, however in other embodiments the cylindrical section 104 and the flange section 106 could be separate parts that are attached together to create the main body 102. Although in other embodiments different materials may be used, in the depicted embodiment the main body 102 is constructed of a rigid plastic material (such as, but not limited to, polyvinyl chloride (PVC) or acrylonitrile butadiene styrene (ABS)), the flexible seal is constructed of an elastomeric material (such as, but not limited to, a rubber material), and the retaining clips are constructed of a rust inhibitive material (such as, but not limited to, stainless steel).

FIG. 2 is a top view of a replacement closet flange in accordance with one exemplary embodiment of the present invention. In the depicted embodiment, the replacement closet flange 100 includes edge recesses 116 and a pair of semi-circular opposed key-shaped slots 112 for receiving bolts that are used to secure the flat underside of the base of a toilet to the flange section 106 of the replacement closet flange 100. In a typical installation, the cylindrical section 104 of the replacement closet flange 100 extends through a hole in the floor through which the top end of a drain pipe is accessible such that the flange section 106 of the replacement closet flange 100 overlaps the floor. Counter-sunk holes 114 are also formed in the flange section 106 to facilitate other forms of connection between the replacement closet flange 100 and the floor.

FIG. 3 is a cross-section view of the replacement closet flange of FIG. 2 taken along line A-A, in accordance with one exemplary embodiment of the present invention. As shown in the figure, each of the retaining clips 110 includes a retaining tab 118 proximate a lower end thereof. In various embodiments, when the replacement closet flange 100 is installed into the drain pipe the retaining tab 118 is configured to fixedly engage with the drain pipe inner surface, thus locking the replacement closet flange 100 in position. In the depicted embodiment, the retaining tab 118 is a portion of the retaining clip 110 that extends upward and outward from the remaining portion of the retaining clip 110 and that includes two pointed ends 120 (see FIG. 1). In such a manner, while the retaining tab 118 is configured to allow insertion of the replacement closet flange 100 into the end of the drain pipe (i.e, by deflecting inward), the pointed ends 120 of the retaining tab 118 are configured to dig into the inner surface of the drain pipe.

The depicted embodiment of the replacement closet flange 100 includes four retaining clips 110 approximately equally spaced about an outer periphery of the cylindrical section 104 of the main body 100. It should be noted that in other embodiments, however, the replacement closet flange may include more or less retaining clips (including as few as one retaining clip) and the retaining clips may or may not be approximately equally spaced about the outer periphery of the cylindrical section 104. It should also be noted that although in the depicted embodiment the retaining tab 118 includes two pointed ends 120, in other embodiments the retaining tab may include one pointed end or three or more pointed ends. In still other embodiments the retaining tab may not include a pointed end, but may otherwise be configured to allow insertion of the replacement closet flange into the end of the drain pipe while still fixedly engaging with the inner surface of the drain pipe such that when installed, the replacement closet flange is locked in position.

The flexible seal 108 of the depicted embodiment includes four rings 122 each configured to contact the inner surface of the drain pipe. In such a manner, when the replacement closet flange 100 is installed in the end of the drain pipe, the flexible seal 108 is configured to sealingly engage with the inner surface of the drain pipe. In the depicted embodiment, the edge of each ring 122 of the flexible seal 108 has a substantially symmetrical v-shaped profile. It should be noted, however, that in other embodiments the flexible seal may have more or less rings than shown in the depicted embodiment (including as few as one ring), and the shape(s) of the ring(s) may differ from those shown in the depicted embodiment. For example, in some embodiments that have a plurality of rings, each ring may have a different shape and/or edge profile, and in some embodiments, each ring may have a different outer diameter.

The flexible seal 108 of the depicted embodiment is attached to the cylindrical section 104 of the main body 102 via a stretch fit. In other embodiments, however, the flexible seal 108 may be attached in a variety of other ways, including, but not limited to, welding, gluing, or insert molding. In the depicted embodiment, the cylindrical section 104 of the main body 102 also includes a portion 124 having a decreased outer diameter as compared to outer diameter of the remaining portion of the cylindrical section 104. As such, the decreased outer diameter portion 124 of the cylindrical section 102 may serve as a locating feature when positioning the flexible seal 108 during assembly of the replacement closet flange 100.

FIG. 4 is a partial cross-section view in close-up of a portion of the replacement closet flange of FIG. 3 in accordance with one exemplary embodiment of the present invention. Dashed lines indicate the approximate location of the floor 126 and an inner surface 128 of the drain pipe when the replacement closet flange 100 is installed. Although in the figure the flexible seal 108 and the retaining tab 118 are shown in an undeflected state, as demonstrated schematically by their respective overlapping positions, it is clear that when the replacement closet flange 100 is installed into the end of a drain pipe, the rings 122 of flexible seal 108 deflect and sealingly engage with the inner surface 128 of the drain pipe and the retaining clips 110 deflect and fixedly engage with the inner surface 128 of the drain pipe.

The main body 102 includes a groove 130 extending into a portion of the flange section 106 proximate the upper end of the cylindrical section 104. In such a manner, the upper ends of the retaining clips 110 may be inserted into the groove 130. In the depicted embodiment, each retaining clip 110 also includes an installation tab 132 that is configured to fixedly engage with a surface within the groove 130. In such a manner, when the upper end of the retaining clip 110 is inserted into the groove 130, the retaining clip 110 is locked in position against the cylindrical section 104 of the main body 102. In the depicted embodiment, the installation tab 132 is a portion of the retaining clip 110 that extends downward and outward from the remaining portion of the retaining clip 110 and that includes two pointed ends 134. In such a manner, while the installation tab 132 is configured to allow insertion of the retaining clip 110 into the groove 130 of the main body 102 (i.e., by deflecting inward), the pointed ends 134 of the installation tab 132 are configured to dig into a surface of the groove 130.

It should be noted that although in the depicted embodiment the installation tab 132 includes two pointed ends 134, in other embodiments the installation tab may include one pointed end or three or more pointed ends. In still other embodiments, the installation tab may not include a pointed end, but may otherwise be configured to allow insertion of the retaining clip into the groove while still fixedly engaging with a surface of the groove such that when installed, the retaining clip is locked in position. It should further be noted that although in the depicted embodiment the retaining clips 110 are attached to the main body 102 using a groove, in other embodiments individual slots may be provided at each retaining clip position instead of a single groove. In still other embodiments, the retaining clips may be attached to the main body in a variety of other ways, including, but not limited to, welding, gluing, or insert molding.

Many modifications and other embodiments of the invention set forth herein will come to mind to one skilled in the art to which this invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, although the description above describes using the replacement closet flange with respect to a drain pipe, it is understood that the replacement closet flange described herein can be used with respect to any similar apparatus, such as, for example, a fitting hub. Although specific terms are employed herein, they are used in a generic and descriptive sense only and not for purposes of limitation.

That which is claimed:

1. A replacement closet flange for installing into an end of a drain pipe having an inner surface, said replacement closet flange comprising:
   a main body comprising a substantially cylindrical section and a flange section extending radially outward from and approximately perpendicular to an upper end of the cylindrical section;
   a flexible seal attached to at least a portion of the cylindrical section proximate a lower end thereof and configured, when the replacement closet flange is installed, to sealingly engage with the inner surface of the drain pipe; and
   at least one retaining clip attached to a location about an outer periphery of the cylindrical section,
   wherein the retaining clip includes a retaining tab proximate one end of the retaining clip configured, when the replacement closet flange is installed, to fixedly engage with an inner surface of the drain pipe, thus locking the replacement closet flange in position, and an installation tab located proximate a second end of the retaining clip configured to engage with the main body, thus securing the retaining clip to the main body.

2. The replacement closet flange of claim 1, wherein the retaining tab extends outward and upward from the retaining clip.

3. The replacement closet flange of claim 1, wherein the retaining tab includes at least one pointed end configured to facilitate engagement with the inner surface of the drain pipe.

4. The replacement closet flange of claim 3, wherein the retaining tab includes two pointed ends configured to facilitate engagement with the inner surface of the drain pipe.

5. The replacement closet flange of claim 1, wherein the replacement closet flange includes a plurality of retaining clips approximately equally spaced about an outer periphery of the cylindrical section.

6. The replacement closet flange of claim 1, wherein the main body comprising the flange section and the cylindrical section is a single part.

7. The replacement closet flange of claim 1, wherein the flange and cylindrical sections are constructed of a rigid plastic material, the flexible seal is constructed of an elastomeric material, and the retaining clip is constructed of a rust inhibitive material.

8. The replacement closet flange of claim 7, wherein the rust inhibitive material is stainless steel.

9. The replacement closet flange of claim 1, wherein the portion of the cylindrical section proximate the lower end thereof has a decreased outer diameter and is configured to position the flexible seal.

10. The replacement closet flange of claim 1, wherein the flexible seal is attached to the portion of the cylindrical section via a stretch fit.

11. The replacement closet flange of claim 1, wherein the flexible seal further comprises at least one outwardly extending tapered ring configured, when the replacement closet flange is installed, to sealingly engage with the inner surface of the drain pipe.

12. The replacement closet flange of claim 1, wherein the flexible seal includes a plurality of outwardly extending tapered rings configured, when the replacement closet flange is installed, to sealingly engage the inner surface of the drain pipe.

13. A replacement closet flange for installing into an end of a drain pipe having an inner surface, said replacement closet flange comprising:
   a main body comprising a substantially cylindrical section and a flange section extending radially outward from and approximately perpendicular to an upper end of the cylindrical section;
   a flexible seal attached to at least a portion of the cylindrical section proximate a lower end thereof and configured, when the replacement closet flange is installed, to sealingly engage with the inner surface of the drain pipe; and
   at least one retaining clip attached to a location about an outer periphery of the cylindrical section,
   wherein the retaining clip includes a retaining tab proximate one end of the retaining clip configured, when the replacement closet flange is installed, to fixedly engage with an inner surface of the drain pipe, thus locking the replacement closet flange in position, and an installation tab located proximate a second end of the retaining clip configured to engage with the main body, thus securing the retaining clip to the main body, and
   wherein the flange section includes a slot extending into a portion thereof proximate the upper end of the cylindrical section, and the installation tab is configured to engage with a surface within the slot.

14. A method of assembling a replacement closet flange, said method comprising:
   receiving a main body comprising a substantially cylindrical section and a flange section extending outward from and approximately perpendicular to an upper end of the cylindrical section;
   receiving a flexible seal;
   receiving at least one retaining clip, wherein the retaining clip includes an outwardly extending retaining tab located proximate an end thereof, the retaining clip configured, when the replacement closet flange is installed, to fixedly engage with an inner surface of a drain pipe;
   attaching the flexible seal around at least a portion of the cylindrical section proximate a lower end thereof; and
   attaching the retaining clip to a location about an outer periphery of the cylindrical section of the main body, wherein the retaining clip includes an installation tab located proximate a second end thereof, and wherein the step of attaching the retaining clip to a location about an outer periphery of the cylindrical section of the main body comprises engaging the retaining clip with the main body, thus securing the retaining clip to the main body.

15. The method of claim 14, wherein the step of receiving at least one retaining clip comprises receiving a plurality of retaining clips, each retaining clip including an outwardly extending retaining tab located proximate an end thereof.

16. The method of claim 15, wherein each of the plurality of retaining clips includes an installation tab located proximate a second end thereof, and wherein the step of attaching the retaining clip to a location about an outer periphery of the cylindrical section of the main body comprises engaging the plurality of retaining clips with the main body at approximately equal spacing about the outer periphery of the cylindrical section.

17. The method of claim 14, wherein attaching the flexible seal around at least a portion of the cylindrical section proximate a lower end thereof comprises stretching the flexible seal around the portion of the cylindrical section proximate the lower end thereof to create a stretch fit.

18. A method of assembling a replacement closet flange, said method comprising:
   receiving a main body comprising a substantially cylindrical section and a flange section extending outward from and approximately perpendicular to an upper end of the cylindrical section;
   receiving a flexible seal;
   receiving at least one retaining clip, wherein the retaining clip includes an outwardly extending retaining tab located proximate an end thereof, the retaining clip configured, when the replacement closet flange is installed, to fixedly engage with an inner surface of a drain pipe;
   attaching the flexible seal around at least a portion of the cylindrical section proximate a lower end thereof; and
   attaching the retaining clip to a location about an outer periphery of the cylindrical section of the main body, wherein the retaining clip includes an installation tab located proximate a second end thereof, and wherein the step of attaching the retaining clip to a location about an outer periphery of the cylindrical section of the main body comprises engaging the retaining clip with the main body, thus securing the retaining clip to the main body, and
   wherein the flange section includes a slot extending into a portion thereof proximate the upper end of the cylindrical section, and the step of attaching the retaining clip to a location about a periphery of the cylindrical section of the main body comprises inserting the second end of the retaining clip into the slot such that the installation tab engages with a surface within the slot.

* * * * *